United States Patent
Greve et al.

(10) Patent No.: US 7,431,891 B2
(45) Date of Patent: Oct. 7, 2008

(54) DEVICE FOR CONTROLLING THE TEMPERATURE OF CHEMICAL MICROREACTORS

(75) Inventors: Thomas Greve, Darmstadt (DE); Guido Pieper, Mannheim (DE); Gerd Quenzer, Modautal (DE); Michael Schmelz, Griesheim (DE); Hanns Wurziger, Darmstadt (DE); Lothar Spreng, Otzberg (DE); Norbert Schwesinger, Eching (DE)

(73) Assignee: Merck Patent GmbH, Darmstadt (DE)

( * ) Notice: Subject to any disclaimer, the term of this patent is extended or adjusted under 35 U.S.C. 154(b) by 472 days.

(21) Appl. No.: 10/432,843

(22) PCT Filed: Nov. 23, 2001

(86) PCT No.: PCT/EP01/13649

§ 371 (c)(1),
(2), (4) Date: May 28, 2003

(87) PCT Pub. No.: WO02/43853

PCT Pub. Date: Jun. 6, 2002

(65) Prior Publication Data

US 2004/0028562 A1    Feb. 12, 2004

(30) Foreign Application Priority Data

Nov. 29, 2000 (DE) .............................. 100 59 295
Apr. 11, 2001 (DE) .............................. 101 18 030

(51) Int. Cl.
*G05D 23/00* (2006.01)

(52) U.S. Cl. ........................................... 422/109; 422/99
(58) Field of Classification Search ................... 422/99, 422/109; 257/930, E23.082, E23.08
See application file for complete search history.

(56) References Cited

U.S. PATENT DOCUMENTS

| | | | | |
|---|---|---|---|---|
| 4,402,185 | A * | 9/1983 | Perchak | 62/3.3 |
| 4,865,986 | A * | 9/1989 | Coy et al. | 435/285.1 |
| 5,061,630 | A * | 10/1991 | Knopf et al. | 422/99 |
| 5,641,400 | A | 6/1997 | Kaltenbach et al. | |
| 6,271,021 | B1 * | 8/2001 | Burns et al. | 435/287.2 |
| 6,525,343 | B1 | 2/2003 | Tanga et al. | |
| 6,562,121 | B2 * | 5/2003 | Nickel et al. | 106/493 |
| 6,657,169 | B2 | 12/2003 | Brown | |
| 6,734,401 | B2 | 5/2004 | Bedingham et al. | |

FOREIGN PATENT DOCUMENTS

| | | |
|---|---|---|
| DE | 19812067 | 10/1999 |
| EP | 1174182 | 1/2002 |
| WO | WO 8912502 | 12/1989 |
| WO | WO 9850147 | 11/1998 |

* cited by examiner

*Primary Examiner*—Jill Warden
*Assistant Examiner*—Natalia Levkovich
(74) *Attorney, Agent, or Firm*—Millen, White, Zelano & Branigan, P.C.

(57) ABSTRACT

In a device for the temperature control of microcomponents, in particular micro-reactors, which preferably have a plate-shaped design and preferably consist of silicon, at least one microcomponent is pressed against a temperature-control element in a holder. A flat heat-conducting connection exists between the microcomponent and the temperature-control element.

20 Claims, 3 Drawing Sheets

ERSATZBLATT (REGEL 26)

DEVICE FOR CONTROLLING THE TEMPERATURE OF CHEMICAL MICROREACTORS

Figure 1:
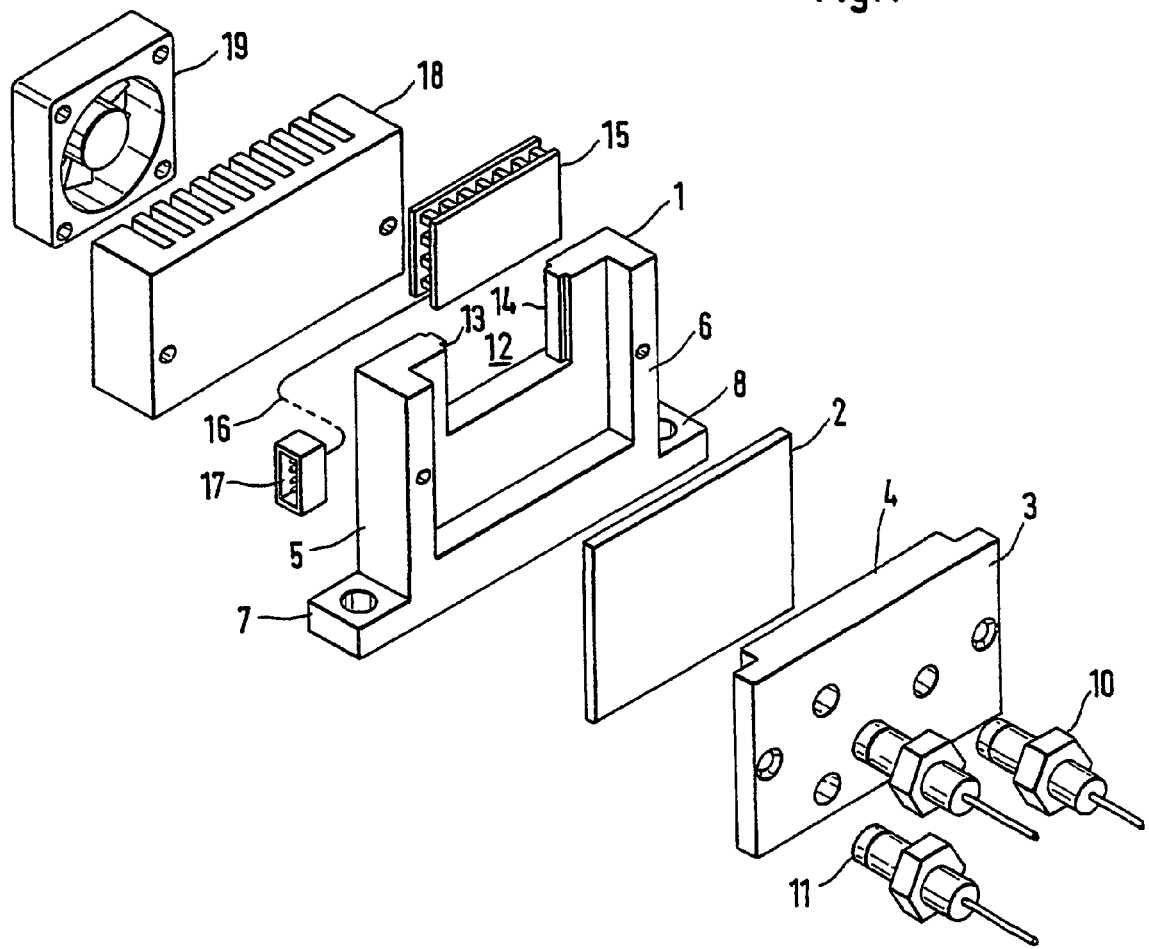

The invention relates to a device for the temperature control of microcomponents, in particular chemical microreactors, which preferably have a plate-shaped design and preferably consist of silicon.

The development and preparation of novel substances in the area of chemistry frequently necessitates extensive series of experiments. For this purpose, microcomponents have been disclosed with the aid of which the experiments can be carried out with small amounts. The modular construction of these microcomponents, for example microreactors and other components for the treatment of various substances, facilitates easy assembly of systems for the particular task. Modular chemical microsystems of this type are described in DE 198 54 096 A1 and DE 199 17 398 A1.

The reactions desired in each case frequently require that pre-specified temperatures be maintained. The object of the present invention is to control the temperature of microcomponents, in particular microreactors, in an advantageous manner, with retention of the flexibility of the systems consisting of microcomponents. This object is achieved in accordance with the invention by the provision of a temperature-control element and a flat heat-conducting connection between the microcomponent and the temperature-control element.

According to an advantageous embodiment of the invention, it is provided that the temperature-control element is a Peltier element. This embodiment has the advantage, inter alia, that a relatively fast change in the input or output thermal performance is possible. For further heat exchange with the environment, it can be provided in this embodiment that a heat exchanger to which a cooling or heating medium can be fed is arranged on the side of the Peltier element facing away from the microcomponent. The heat exchanger here can preferably be formed by an enlarged surface for heat exchange with the ambient air. The heat exchange may be supported by a fan.

In another advantageous embodiment of the invention, temperature control is achieved by the temperature-control element being a heat exchanger to which a cooling or heating medium can be fed. The cooling or heating medium here can be, for example, water or a heat-transfer oil.

In both advantageous embodiments, the heat exchanger can have a hollow design and be provided with line connections for the cooling or heating medium.

It is preferably provided in the invention that the heat-exchanging surface of the temperature-control element essentially has the size of the adjacent surface of the microcomponent. Should, however, a surface which is suitable for heat exchange be present in only some of the microcomponents, the device according to the invention can also be refined in such a way that the heat-exchanging surface of the temperature-control element is smaller than the adjacent surface of the microcomponent.

In another refinement of the device according to the invention, it is provided that a holder has a U-shaped accommodation part for the microcomponent and for the temperature-control element, with two arms whose ends can be screwed to a pressure plate.

In order to be able to clamp microcomponents of different thickness or stacks of microcomponents using a single holder, it is provided in accordance with a further advantageous embodiment that the pressure plate has a thickened central part which fits between the arms of the U-shaped accommodation part.

In another advantageous embodiment, a clever arrangement of the temperature-control element, in particular a Peltier element, is facilitated through an aperture for the accommodation of the temperature-control element being arranged in the region of the U-shaped accommodation part that is opposite the pressure plate.

A further advantageous embodiment enables connections to the outside through holes being provided in the pressure plate for accommodation of connection elements.

Handling of the device according to the invention, in particular the running of electric lines, can be simplified by electrical connections for the temperature-control element being provided on the accommodation part.

Depending on the application of the device according to the invention, various materials are available for the holder. However, it has proven advantageous for the holder to consist of thermally resistant plastic.

As already mentioned, a plurality of microcomponents can be assembled and connected to one another, optionally as a stack. Temperature control can take place here through a plurality of microcomponents being held against one another and an outer microcomponent being connected in a heat-conducting manner to the temperature-control element or furthermore the other outer microcomponent being connected in a heat-conducting manner to a further temperature-control element. The temperature control of both sides of the stack can take place in the same direction in order to control the temperature of a plurality of microcomponents in the same direction, for example to cool or heat them. However, it is also possible to carry out the temperature control with different temperatures on the two sides of the stack, for example to cool one of the outer microcomponents and to warm the other.

In order to reduce the temperature equalization between the microcomponents, it may be provided that plates of low thermal conductivity are arranged between adjacent microcomponents. It may be provided here that the plates have apertures for passing substances between the neighbouring microcomponents, which are likewise provided with apertures.

In order to maintain a pre-specified temperature, it may furthermore be provided in the device according to the invention that at least one sensor is provided for measuring the temperature of at least one microcomponent, this sensor controlling at least one regulator of the temperature control element.

An advantageous arrangement of a sensor in which good heat transfer from the microcomponent to the sensor is ensured can be effected by arranging the at least one sensor in a groove in a holder, which groove is open in the direction of the adjacent microcomponent.

Figure 1A:
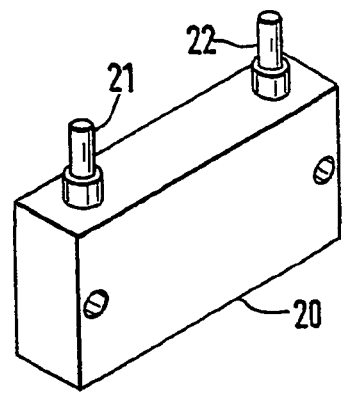
Figure 2:
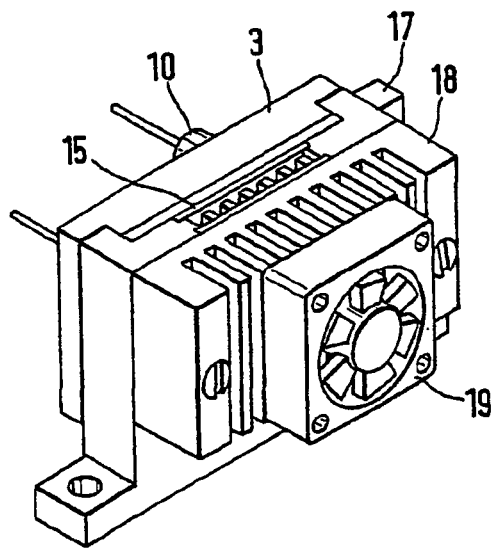
Figure 3:
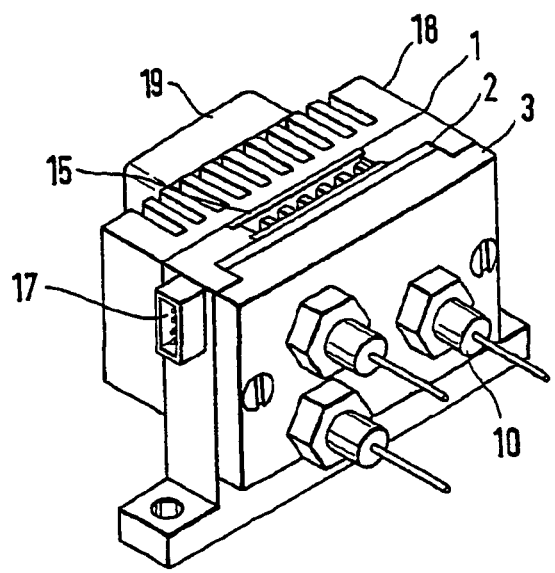
Figure 4:
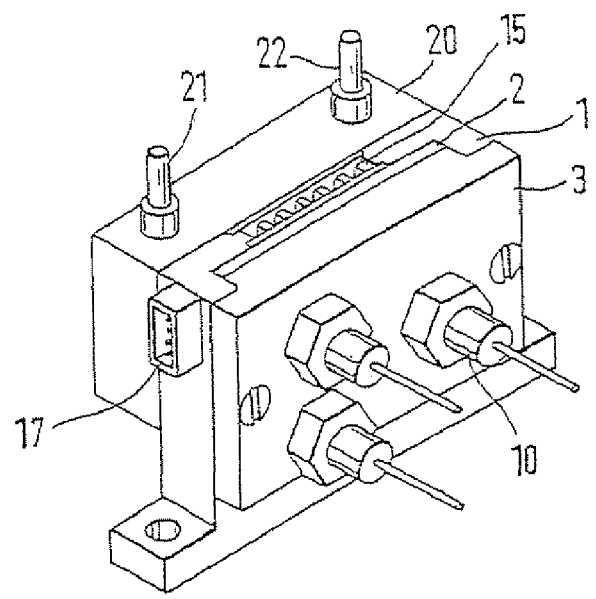
Figure 5:
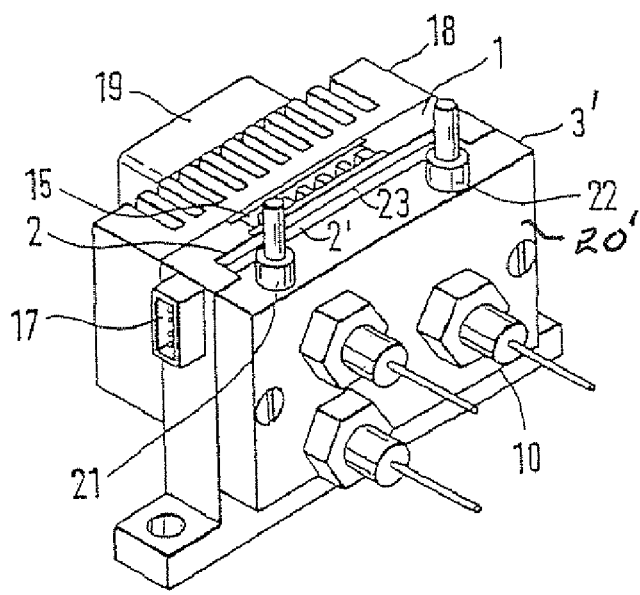
Figure 6:
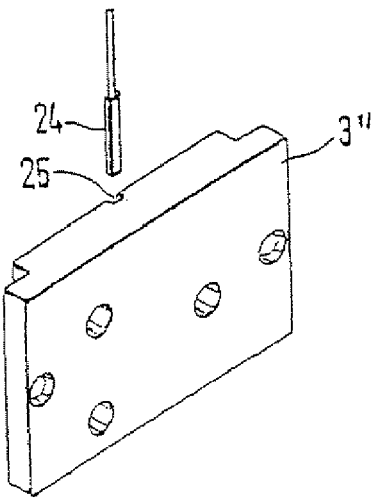

Illustrative embodiments of the invention are shown in the drawing with reference to a number of figures and explained in greater detail in the following description. In the drawing:

FIG. 1 shows an exploded view of the parts of a device according to the invention, FIG. 1*a* shows a further part, FIG. 2 and FIG. 3 show two different views of the illustrative embodiment according to FIG. 1 in the assembled state, FIG. 4 shows a second illustrative embodiment, FIG. 5 shows a third illustrative embodiment, and FIG. 6 shows a part of the illustrative embodiment according to FIG. 1 with a sensor.

The device according to FIG. 1 consists of a U-shaped accommodation part 1 or holder for the accommodation of at least one microcomponent 2, and a pressure plate 3, which can be screwed to side webs 5, 6 (arms) of the accommodation part 1. The pressure plate 3 is thickened in its central region 4. In the illustrative embodiment, a single microcomponent is shown, but it is also possible for a plurality of microcomponents to be held. The accommodation part 1 has two flange-like extensions 7, 8 for attachment to a suitable base. Connecting elements 10, each of which carries a sealing disc 11 on its end face and which form liquid- or optionally gas-tight connections to the surface of the microcomponent, can be screwed into the pressure plate 3.

A cut-out 12 in the accommodation part 1 is formed at two opposite edges 13, 14 in such a way that a positive connection is formed with the side contours of a Peltier element 15 that functions as a temperature control element. A cable connection 16, shown interrupted in FIG. 1, serves for the supply of electrical energy to the Peltier element 15 via a multiconductor plug 17. The connection 16 can be passed through a hole (not shown) in the accommodation part 1, enabling the multiconnector plug 17 to be mounted directly on the accommodation part 1 (FIG. 2 and FIG. 3). The Peltier element 15 generates a temperature difference depending on the applied voltage and can therefore be used for the supply and removal of heat to or from the microcomponent 2. The microcomponent 2 is pressed against the Peltier element 15, which is accommodated in the U-shaped holder 1 in a flat heat conducting connection. Consequently, the connection between the Peltier element 15 and the microcomponent is direct and there is mechanical abutment therebetween. As is clear from FIG. 1, Peltier element 15 is a separate element from the microcomponent 2. Simple and rapid reversal of the heat flow is possible. For heat exchange with the environment, an element 18, whose surface area is increased by means of a series of ribs, is provided in the example according to FIG. 1. A stream of air from a fan 19 is directed between the ribs.

In the commercially available Peltier elements which are suitable for the device according to the invention, for example in respect of their size, the cooling/heating capacity is limited. If higher capacities, in particular temperature differences, should be necessary, a plurality of Peltier elements can be connected in series or joined together in the shape of a stepped pyramid. Instead of the element 18, it is also possible for a heat exchanger 20 (FIG. 1a), which has a cavity for the through-flow of a cooling/heating medium, which can be fed in and removed via connections 21, 22, to be connected to the Peltier element 15.

In the illustrative embodiment shown in FIG. 4, a cooling element 20 as shown in FIG. 1a may be provided instead of the ribbed element 18 (FIGS. 1 to 3) for the supply or dissipation of the heat transported by the Peltier element 15.

The illustrative embodiment according to FIG. 5 shows a device according to the invention in which two microcomponents in the form of chemical reactors 2, 2' separated by a plate 23 are arranged in the holder 1, 3'. The plate 2, 3 is of low conductivity and serves for the sealing-off of substances passed between the microcomponents 2, 2' and for heat insulation. In the illustrative embodiment according to FIG. 5, the pressure plate 3' is provided with channels, not visible in the figure, so that an oil or heating medium, which is fed in or out at 21 and 22, can be passed through it to form a second liquid heat exchanger 20'. For temperature-control of microcomponents 2, 2' or stacks of microcomponents on both sides, two Peltier elements or two heat exchangers through which a cooling or heating medium flows may also be provided in a modification of the illustrative embodiment according to FIG. 5.

FIG. 6 shows a pressure plate 3'' into which a groove 25 for a temperature sensor 24 has been introduced. The sensor then terminates approximately flush with the side of the pressure plate 3'' facing the microcomponent, resulting in good heat-conducting contact with the microcomponent.

The invention claimed is:

1. A device for temperature control of at least one chemical microreactor, comprising: a chemical microreactor (2) that has a plate-shaped configuration with flat contact areas and is made of silicon; a separate heat-control element (15) having a flat contact area, the heat control element (15) disposed in direct flat heat-conducting connection with the chemical microreactor (2) by mechanical abutment of flat contact areas on the chemical microreactor (2) and the heat-control element (15), and a holder (1, 3 and 3') having a U-shaped accommodation part (1) that receives the chemical microreactor (2) and the heat-control element (15), the U-shaped accommodation part (1) having two arms (5, 6), screwed to a pressure plate (3, 3').

2. A device according to claim 1, wherein the separate heat-control element is a Peltier element (15) having a side facing toward the chemical microreactor (2) and an opposite side facing away from the chemical microreactor (2).

3. A device according to claim 2, wherein a heat exchanger (18, 20), to which a cooling or heating medium can be fed, is abutted against the side of the Peltier element (15) facing away from the chemical microreactor (2).

4. A device according to claim 1, wherein the heat exchanger (18) has an enlarged surface area for heat exchange with the ambient air.

5. A device according to claim 4, wherein a fan (19) is supported on the heat exchanger (18) to promote heat exchange.

6. A device according to claim 1, wherein the heat-control element is a heat exchanger (20) to which a cooling or heating medium can be fed.

7. A device according to claim 3, wherein the heat exchanger (20) is hollow and is provided with line connections (21, 22) for the cooling or heating medium.

8. A device according to claim 6, wherein the heat-exchanging surface of the heat exchanger (20') has a size substantially the same as an adjacent surface of the chemical microreactor (2).

9. A device according to claim 1, wherein the heat-exchanging surface of the heat-control element (15) is smaller than an adjacent surface of the chemical microreactor (2).

10. A device according to claim 1, wherein the pressure plate (3') has a thickened central part (4) which fits between the arms (5, 6) of the U-shaped accommodation part (1).

11. A device according to claim 1, wherein an aperture (12) for the accommodation of the heat-control element (15) is arranged in the region of the U-shaped accommodation part (1) that is opposite the pressure plate (3).

12. A device according to claim 1, wherein holes for the accommodation of connecting elements (10) are provided in the pressure plate (3).

13. A device according to claim 1, wherein electrical connections (17) for the heat-control element (15) are provided on the accommodation part.

14. A device according to claim 1, wherein the holder (1, 3, 3') is comprised of thermally resistant plastic.

15. A device according to claim 1, wherein a plurality of chemical microreactors (2, 2') are held against one another with one chemical microreactor (2) connected to the heat-control element (15) in a heat-conducting manner.

16. A device according to claim 15, wherein other chemical microreactor (2') is connected to a heat-control element (3') in a heat-conducting manner.

17. A device according to claim 15, wherein a plate (23) of low thermal conductivity is arranged between adjacent chemical microreactors (2, 2').

18. A device according to claim 17, wherein the plates have apertures for passing substances between the adjacent chemical microreactors (2, 2'), which are likewise provided with apertures.

19. A device according to claim 15, wherein at least one sensor (24) is provided for measuring the temperature of at least one of the chemical microreactors (2, 2') which sensor controls at least one regulator of the heat-control element (15).

20. A device according to claim 19, wherein the at least one sensor (24) is arranged in a groove (25) in a holder (3"), which groove 25 is open in the direction of the adjacent chemical microreactor (2 or 2').

* * * * *

UNITED STATES PATENT AND TRADEMARK OFFICE
CERTIFICATE OF CORRECTION

PATENT NO.         : 7,431,891 B2
APPLICATION NO. : 10/432843
DATED              : October 7, 2008
INVENTOR(S)        : Greve et al.

It is certified that error appears in the above-identified patent and that said Letters Patent is hereby corrected as shown below:

Column 4, line 65 reads "A device according to claim 15, wherein other chemical" should read --A device according to claim 15, wherein the other chemical--

Signed and Sealed this

First Day of December, 2009

David J. Kappos
*Director of the United States Patent and Trademark Office*